United States Patent [19]
Chang

[11] Patent Number: 5,988,375
[45] Date of Patent: Nov. 23, 1999

[54] DISC BOX STRUCTURE

[75] Inventor: Hsing-Chju Chang, Chang-Hua Hsien, Taiwan

[73] Assignee: Snyr Yih Metallic Co., Ltd., Chang-Hwa, Taiwan

[21] Appl. No.: 09/276,901

[22] Filed: Mar. 26, 1999

[51] Int. Cl.⁶ .................................................. B65D 85/57
[52] U.S. Cl. ...................................... 206/308.1; 206/310
[58] Field of Search ................................ 206/308.1, 309, 206/310, 311, 312, 313, 232, 493

[56] References Cited

U.S. PATENT DOCUMENTS

| | | | |
|---|---|---|---|
| 5,551,560 | 9/1996 | Weisburn et al. | 206/310 |
| 5,788,068 | 9/1998 | Fraser et al. | 206/310 |

*Primary Examiner*—Jacob K. Ackun
*Attorney, Agent, or Firm*—Rosenberg, Klein & Bilker

[57] ABSTRACT

A disc box structure including a box body and a cover body pivotally connected with one side of the box body. An annular stepped projection is formed in the box body. The center of the annular projection is disposed with two opposite lifted engaging members. The lower ends of the engaging members are connected with the bottom face of the box body, while the upper ends of the engaging members are disposed with substantially semicircular opposite fitting ribs. An engaging projection is formed on an upper end of a middle section of the outer edge of each fitting rib. The inner edges of the opposite fitting ribs have several inward extending resilient bridge ribs which commonly connect with a pressing member, whereby-the engaging members have better structural strength and are protected from breaking due to shearing force of the disc. When it is desired to take out the disc, a user only needs to depress the pressing member between the engaging members to easily take out the disc.

1 Claim, 7 Drawing Sheets

DISC BOX STRUCTURE

BACKGROUND OF THE INVENTION

The present invention relates to a disc box structure in which the engaging members for fixing the disc have better structural strength and permit a user to easily take out the disc.

FIG. 1 shows a conventional disc box including a box body 10 and a cover body 20 pivotally connected with one side of the box body 10. A U-shaped peripheral frame 11 is disposed along the other three sides of the box body 10. A middle section of a front face of the peripheral frame 11 is formed with an inward recess 111. An inner face of the box body 10 is disposed with an annular stepped projection 12. The center of the stepped projection 12 is disposed with two opposite lifted engaging members 13. A lower end of each engaging member 13 is connected with the bottom face of the box body 10. An upper end thereof is disposed with a substantially semicircular opposite fitting protuberance 131. A tenon 132 is formed on an upper end of a middle section of the arch edge of the fitting protuberance 131, which extends in a direction reverse to the engaging member 13. An upper section of the engaging member 13 is disposed with a perforation 133 corresponding to the tenon 132 for facilitating the demolding operation relative to the tenon 132 during injection molding.

When placing a disc 30 into the disc box, the central circular hole 31 of the disc 30 is fitted with outer edges of the fitting protuberances 131 of the engaging members 13 with the tenons 132 of the engaging members 13 engaged with the circumference of the circular hole 131 of the disc 30.

The above disc box has some shortcomings as follows:
1. The engaging members 13 of the box body 10 are independent members 13 which have poor structural strength. Therefore, in case the disc box is dropped onto the ground (referring to FIG. 2), the engaging members 13 will suffer a reverse shearing force of the disc 30 which may lead to breakage of the engaging members 13 from two sides of the perforations 133.
2. When taking the disc 30, the fitting protuberances 131 of the two engaging members 13 must be pressed at the same time so that it is inconvenient to take out the disc. In addition, in the case that only one engaging member 13 is pressed (referring to FIG. 3), not only the disc 30 cannot be taken out, but also the other engaging member 13 may be forcedly broken or the disc 30 may be deformed or broken.

SUMMARY OF THE INVENTION

It is therefore a primary object of the present invention to provide a disc box structure in which the engaging members are connected to a pressing member by several resilient bridge ribs so that they have better structural strength. Therefore, in case the disc box is dropped onto the ground, the engaging members are protected from breaking due to shearing force of the disc.

It is a further object of the present invention to provide the above disc box structure in which when taking out the disc, a user only needs to press the pressing member between the engaging members for easily taking out the disc without breaking the engaging members or deforming or breaking the disc.

The present invention can be best understood through the following description and accompanying drawings wherein:

DETAILED DESCRIPTION OF THE PREFERRED EMBODIMENTS

Figure 4:
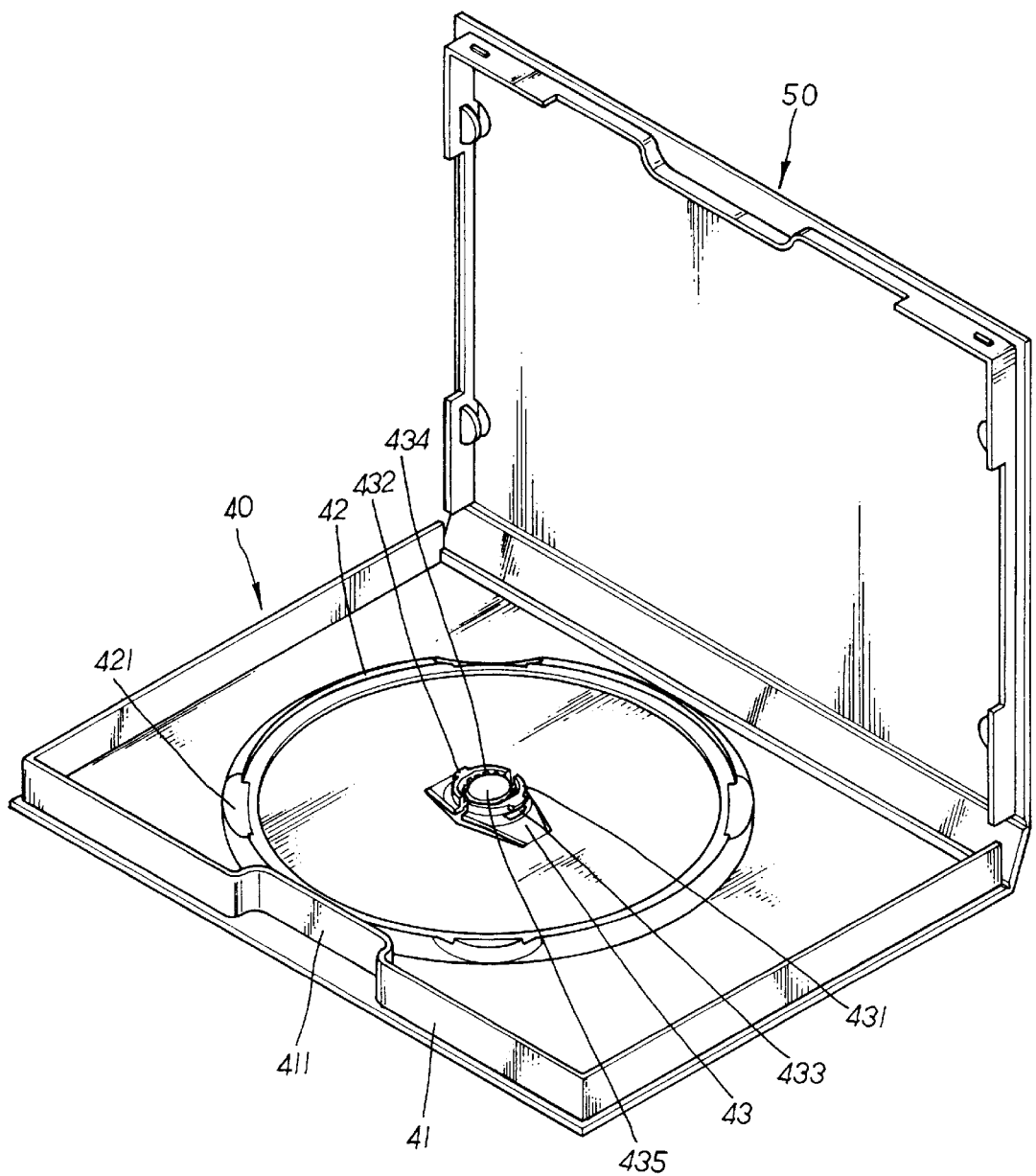
FIG. 4 is a perspective view of the disc box of the present invention.

Please refer to FIG. 4. The disc box of the present invention includes a box body 40 and a cover body 50 pivotally connected with one side of the box body 40. A U-shaped peripheral frame 41 is disposed along the other three sides of the box body 40. A middle section of a front face of the peripheral frame 41 is formed with an inward recess 411. In a state that the cover body 50 is mated with the box body 40, a user can extend his/her finger into the recess 411 to easily open the cover body 50. An annular stepped projection 42 is formed in the box body 40. The inner diameter of the large step of the annular projection 42 is slightly larger than the diameter of the disc 30. The outer circumference of the annular projection 42 is formed with several arch recesses 421 at equal intervals. The center of the annular projection 42 is disposed with two opposite lifted engaging members 43 which gradually expand. The lower ends of the engaging members 43 are connected with the bottom face of the box body 40, while the upper ends thereof are disposed with substantially semicircular opposite fitting ribs 431. An engaging projection 432 is formed on an upper end of a middle section of the outer edge of the fitting rib 431, which extends in a direction reverse to the engaging member 43. An upper section of the engaging member 43 is disposed with a perforation 433 corresponding to the engaging projection 432. In addition, the inner edges of the opposite fitting ribs 431 have several inward extending resilient bridge ribs 434 which commonly connect with a pressing member 435.

Figure 1:
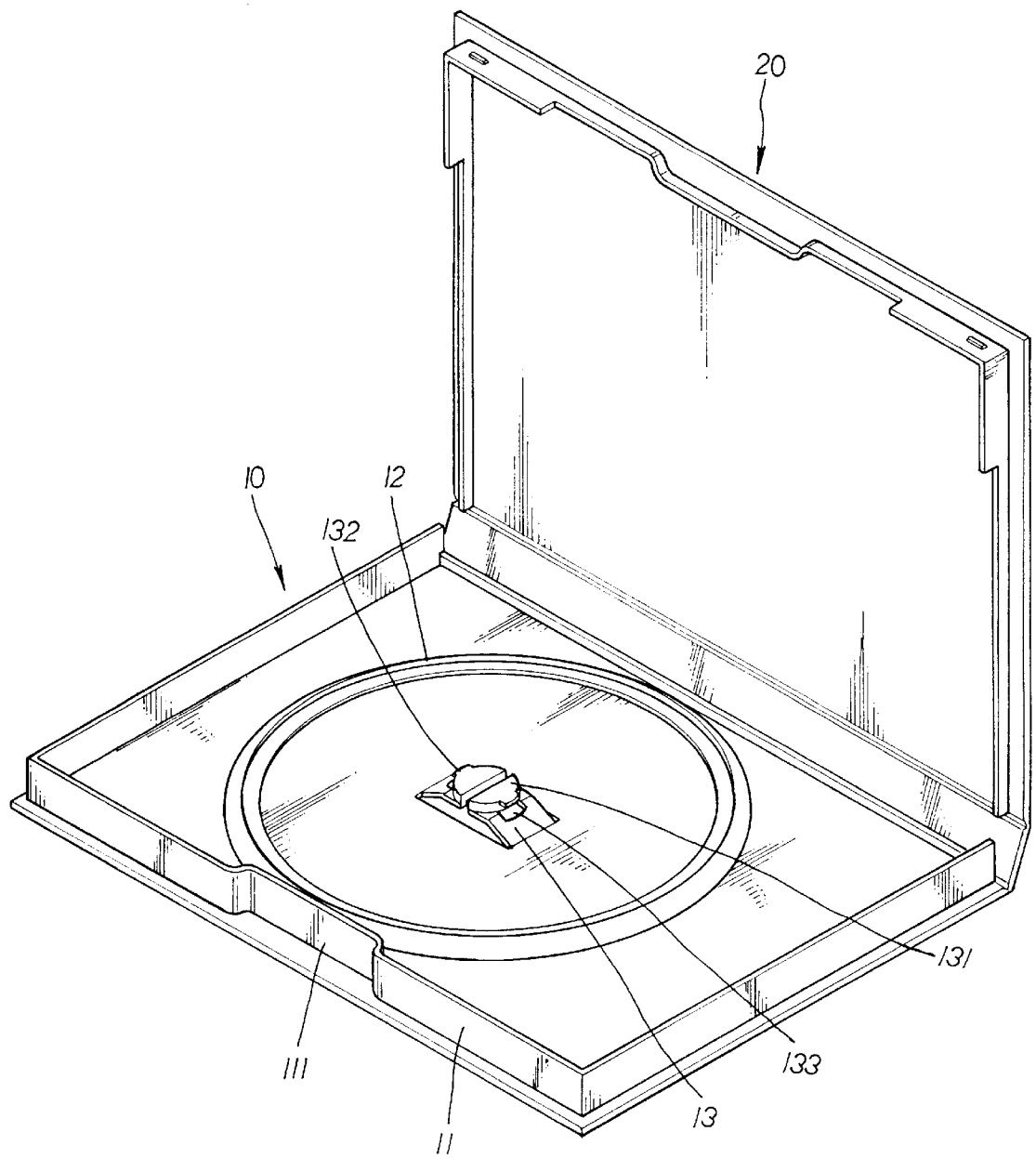
FIG. 1 a perspective view of a conventional disc box.
Figure 2:
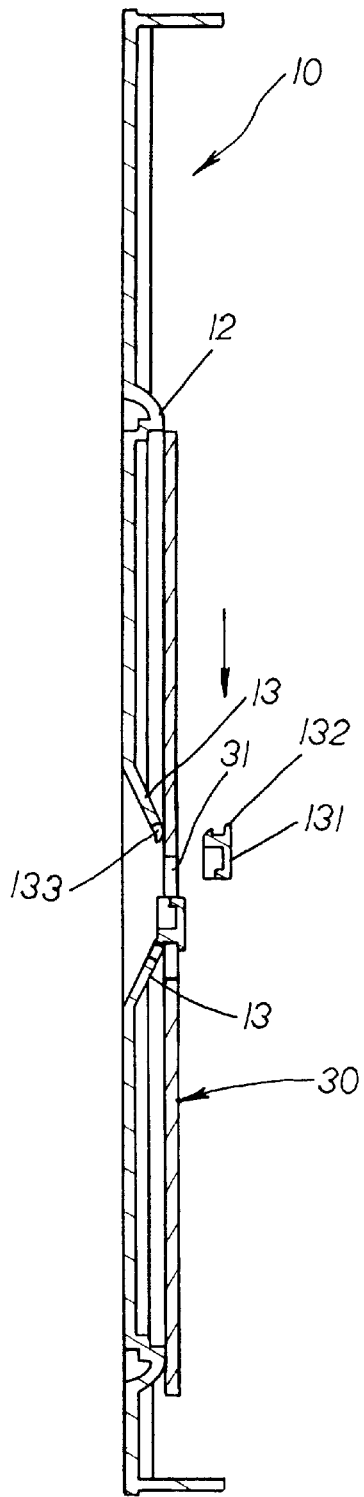
FIG. 2 is a sectional view showing that the engaging members are broken due to dropping of the disc box onto the ground.
Figure 3:
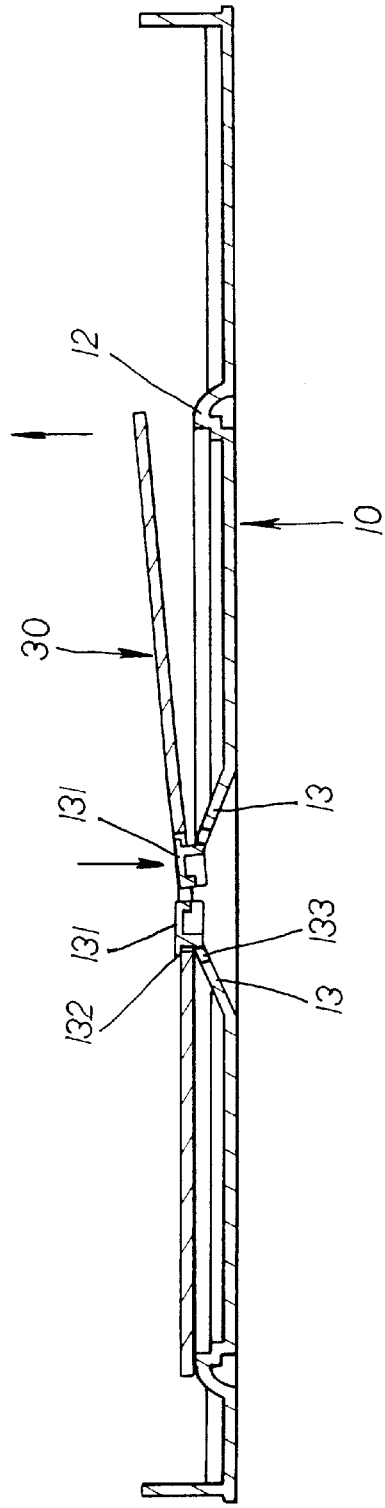
FIG. 3 is a sectional view showing that only one engaging member is pressed and thus the disc cannot be taken out.
Figure 5:
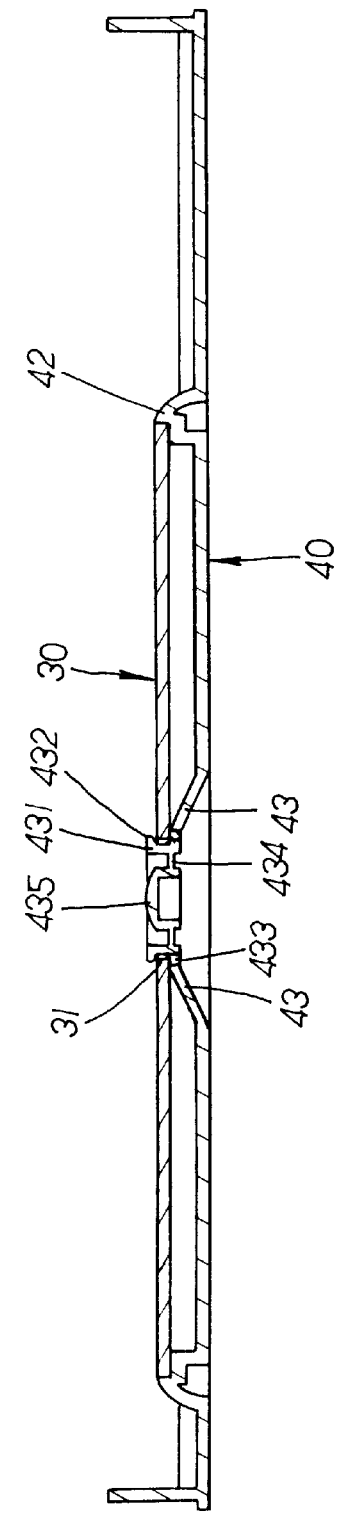
FIG. 5 is a sectional view showing that a disc is placed into the disc box of the present invention.

Referring to FIG. 5, when placing a disc 30 into the disc box, the central circular hole 31 of the disc 30 is fitted with outer edges of the fitting ribs 431 of the engaging members 43 of the box body 40 with the engaging projections 432 of the engaging members 43 engaged with the circumference of the circular hole 131 of the disc 30.

Figure 6:
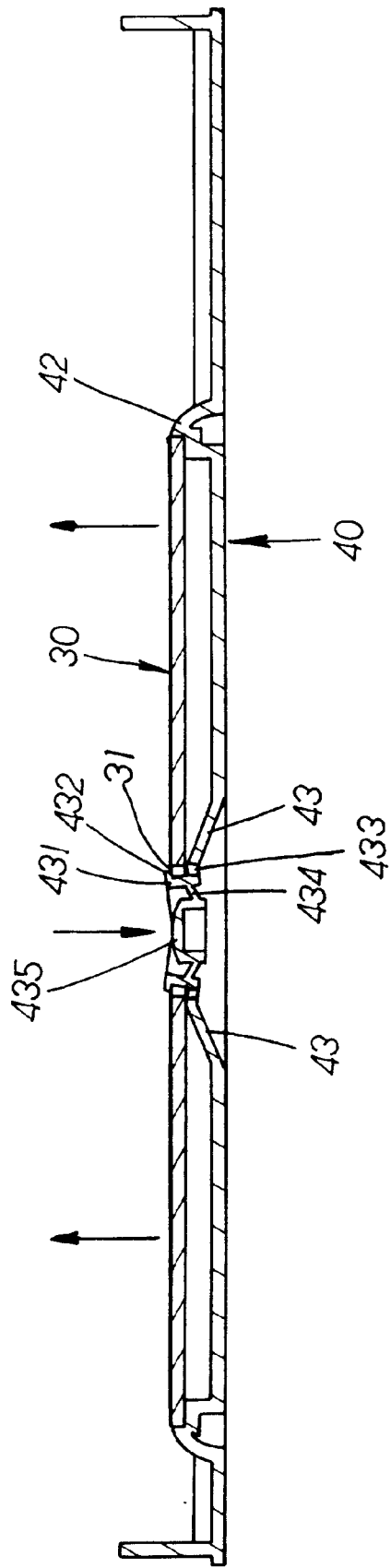
FIG. 6 is a sectional view showing that a disc is taken out of the disc box of the present invention.

Referring to FIG. 6, when taking out the disc 30, the pressing member 435 between the engaging members 43 is depressed, whereby by means of the resilient bridge ribs 434, the opposite fitting ribs 431 of the two engaging members 43 are driven and moved downward. At this time, the engaging projections 432 of the fitting ribs 431 are disengaged from the circumference 31 of the circular hole 31 of the disc 30, permitting a user to easily take out the disc 30.

Figure 7:
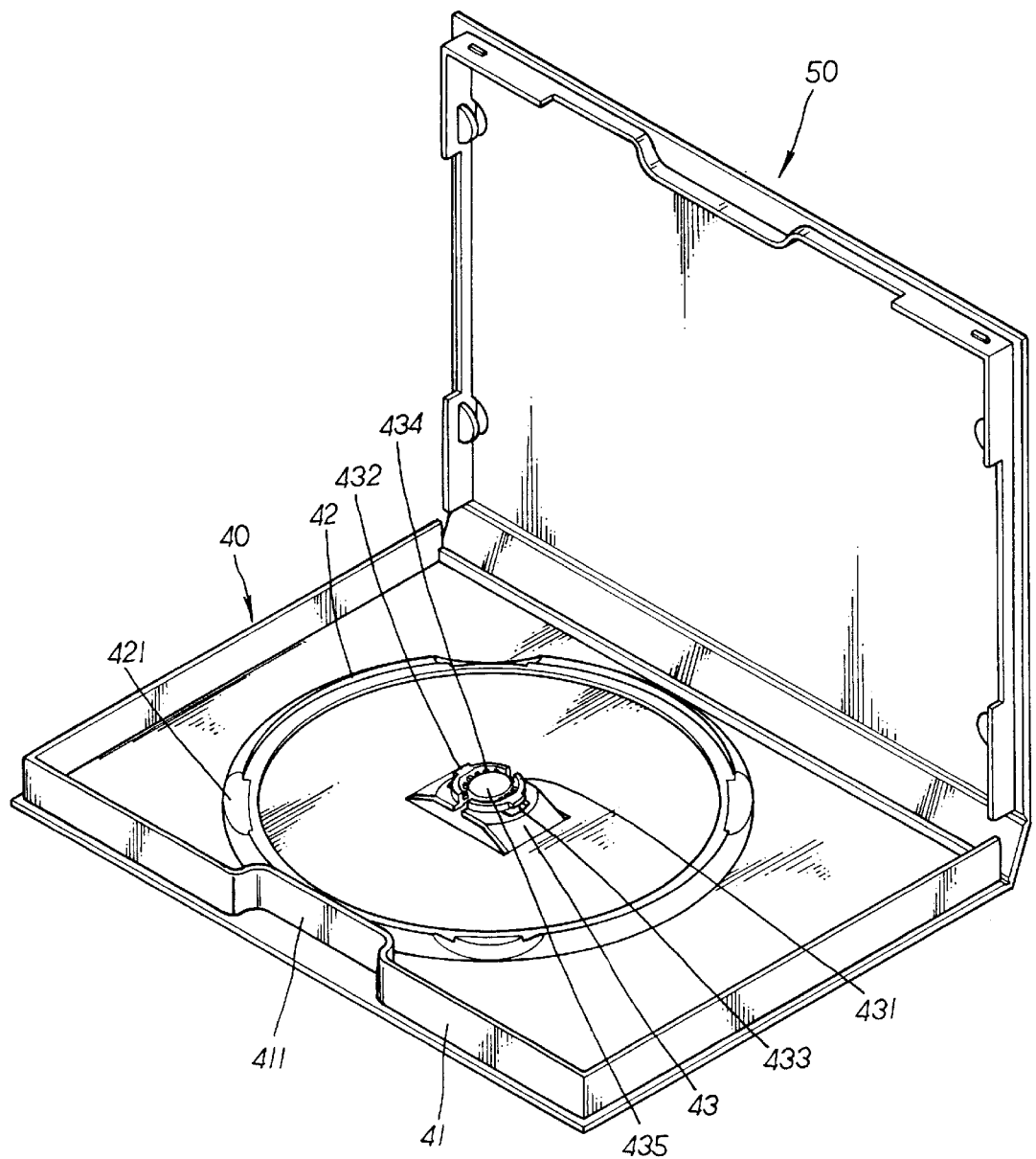
FIG. 7 is a perspective view of another embodiment of the present invention.
Figure 8:
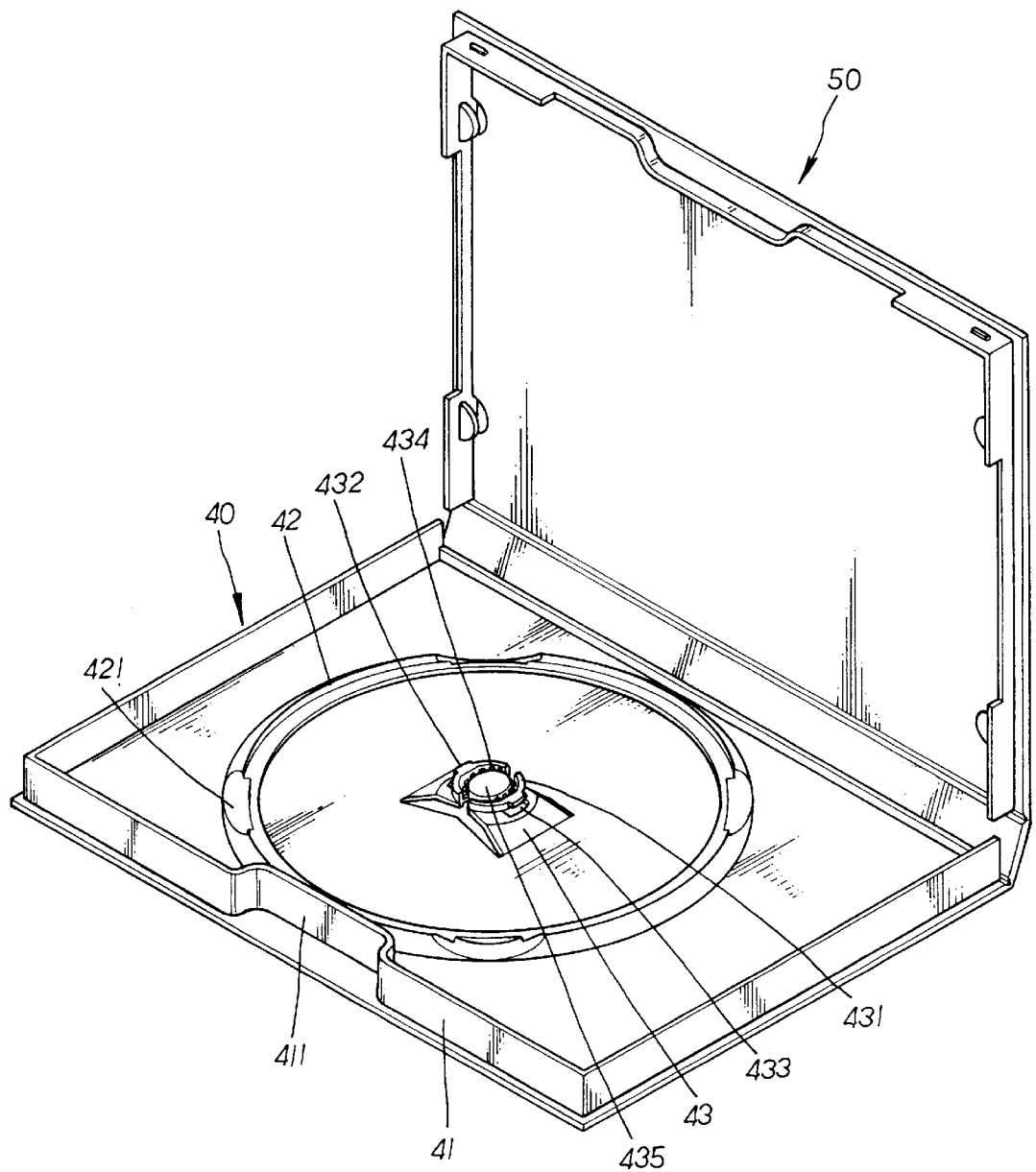
FIG. 8 is a perspective view of still another embodiment of the present invention.

FIGS. 7 and 8 respectively show two other embodiments of the present invention, in which the engaging members 43 can be lifted straight plates or lifted tapered plates.

According to the above arrangements, the present invention has the following advantages:

1. The engaging members 43 are connected to a pressing member 435 by the resilient bridge ribs 434 so that they have better structural strength. Therefore, in case the disc box is dropped onto the ground, the engaging members 43 are protected from breaking from two sides of the perforations 433 due to shearing force of the disc 30.

2. when taking out the disc 30, the pressing member 435 between the engaging members 43 is depressed, whereby by means of the resilient bridge ribs 434, the opposite fitting ribs 431 of the two engaging members 43 are driven and moved downward. At this time, the engaging projections 432 of the fitting ribs 431 are disengaged from the circumference 31 of the circular hole 31 of the disc 30, permitting the disc 30 to be easily take out. Therefore, a user can easily take out the disc 30 without damaging the engaging members 43 or the disc 30.

The above embodiments are only used to illustrate the present invention, not intended to limit the scope thereof. Many modifications of the above embodiments can be made without departing from the spirit of the present invention.

What is claimed is:

1. A disc box structure comprising a box body and a cover body pivotally connected with one side of the box body, a U-shaped peripheral frame being disposed along the other three sides of the box body, a middle sect ion of a front face of the peripheral frame being formed with an inward recess, an annular stepped projection being formed in the box body, an outer circumference of the annular projection being formed with several arch recesses at equal intervals, a center of the annular projection being disposed with two opposite lifted engaging members, lower ends of the engaging members being connected with the bottom face of the box body, said disc box structure being characterized in that the upper ends of the engaging members are disposed with substantially semicircular opposite fitting ribs, an engaging projection being formed on an upper end of a middle section of the outer edge of each fitting rib, the engaging projection extending in a direction reverse to the engaging member, the inner edges of the opposite fitting ribs having several inward extending resilient bridge ribs which commonly connect with a pressing member, whereby the engaging members have better structural strength and when it is desired to take out the disc, a user only needs to depress the pressing member between the engaging members to easily take out the disc.

* * * * *